US006838687B2

(12) United States Patent
Tullis et al.

(10) Patent No.: US 6,838,687 B2

(45) Date of Patent: Jan. 4, 2005

(54) IDENTIFICATION OF RECORDING MEDIA

(75) Inventors: Barclay J. Tullis, Palo Alto, CA (US); Ross R. Allen, Belmont, CA (US); Carl Picciotto, Menlo Park, CA (US); Jun Gao, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/120,613

(22) Filed: Apr. 11, 2002

(65) Prior Publication Data

US 2003/0193034 A1 Oct. 16, 2003

(51) Int. Cl.[7] .......................... G01N 21/86; G01V 8/00

(52) U.S. Cl. ........................... 250/559.07; 250/559.16; 250/559.4; 356/446

(58) Field of Search ................................ 356/446, 448, 356/71, 237.1, 237.4–237.5, 238.1, 239.1, 239.3, 238.8; 250/559.07, 559.11, 559.16, 559.2, 559.39, 559.4, 559.41, 559.22, 559.44, 235, 556; 347/101–102; 358/462, 468, 486

(56) References Cited

U.S. PATENT DOCUMENTS 4,929,845 A * 5/1990 Amir et al. ............ 250/559.05
5,084,627 A 1/1992 Ueki et al.
5,139,339 A 8/1992 Courtney et al.
5,177,802 A * 1/1993 Fujimoto et al. ........... 382/124
5,304,813 A * 4/1994 De Man ..................... 250/556
5,323,176 A * 6/1994 Sugiura et al. ............... 346/25
5,401,977 A 3/1995 Schwaz
5,459,580 A 10/1995 Suzuki
5,764,251 A * 6/1998 Hashimoto ................... 347/16
5,835,975 A 11/1998 Peeters et al.
5,925,889 A 7/1999 Guillory et al.
6,006,668 A 12/1999 Rehmann
6,088,116 A 7/2000 Pfanstiehl
6,101,266 A * 8/2000 Laskowski et al. ......... 382/135
6,233,053 B1 5/2001 Preston et al.
6,291,829 B1 * 9/2001 Allen et al. ............ 250/559.07
6,498,867 B1 * 12/2002 Potucek et al. ............. 382/274
6,605,819 B2 * 8/2003 Ross .......................... 250/556

FOREIGN PATENT DOCUMENTS

EP 1034937 A2 9/2000

* cited by examiner

*Primary Examiner*—Stephone B. Allen
*Assistant Examiner*—Patrick J. Lee

(57) ABSTRACT

The present invention is a method and device for identifying recording media in a printer. The invention utilizes fine structure of the media revealed by illumination from one or more directions to distinguish among different kinds of plain papers, coated papers, such as glossy papers, and transparency films. Multiple light sources at different incidence and/or orientation angles apply light on the test surface, and scattered light is converted into signals and then analyzed. Various metric and analysis techniques can be applied to the signals to determine the media type.

26 Claims, 5 Drawing Sheets

IDENTIFICATION OF RECORDING MEDIA

BACKGROUND

The present invention relates generally to devices and methods for identifying media and more specifically to devices and methods for identifying recording media in a printer or reproduction device.

Modern printing devices, for example, ink jet and laser printers, print on a wide range of print media. Such media include plain paper, glossy or coated papers, and plastic films including overhead transparency film. For optimal print quality, operating parameters of these printers can be adjusted to meet the requirements of each print medium. Parameters in the image rendering process, in a host computer or in an "on-board" computing engine in the printer, also depend upon media type. For example, the "gamma" (i.e., tone reproduction curve) used for reflective prints (on paper and other reflective media) is different than that used for transparency media. This is required to adapt the printed image to the characteristics of the human visual response under different lighting and viewing conditions. Therefore, both the recording process in the printer and the image rendering process, in a host computer or on-board computing engine, may require knowledge of media type for optimal print quality.

The software controlling the rendering process and the printer, including the printer driver, sometimes gives the user the opportunity to specify the recording medium. Parameters of the rendering and recording processes are then adjusted according to the recording medium and the quality mode selection. However, users may not always make the correct choice. In addition, specifying the choice is often inconvenient when multiple copies on different media are desired as occurs when overhead transparencies and hardcopy for handouts must be produced from the same data file.

One approach to this problem is to use recording media marked by machine-readable, visible, near-visible, or invisible marks forming bar codes or other indicia that specify media type and automatically provide process information to the printer. While this offers a practical solution, not all media available to the user will contain these codes.

Other approaches known in the art distinguish between two broad classes of media, transparency film and paper. For example, U.S. Pat. No. 5,139,339, to Courtney et al. discloses a sensor that measures diffuse and specular reflectivity of print media to discriminate between paper and transparency film and to determine the presence of the print medium. Other art cited in Courtney et al. deals mainly with analyzing specular reflections over an area. U.S. Pat. No. 5,323,176 to Suguira et al. describes a printer with means to discriminate between "ordinary printing paper" and "overhead projection transparency film" on the basis of its transparency or opacity. However, the prior art, which relies on gross properties of the print medium either in reflection or in transmission does not allow finer distinctions of the media. Additionally, in particular, the prior art fails to allow a differentiation dependent upon directionality in surface feature granularity, fails to allow a differentiation dependent upon directional structure manufactured into media surface, or both. Further, the existing techniques are typically limited to comparisons of the specular reflections to static, predetermined references for the determination of various recording media.

What is needed are apparatus and techniques to overcome these shortcomings to better distinguish the types of recording media.

SUMMARY

The present invention relates to a method and device for identifying recording media. In one embodiment of the present invention, a first illumination source is disposed near a media illumination zone providing light incident on the media illumination zone at a first angle of incidence. A second illumination source is disposed near the media illumination zone providing light incident on the media illumination zone at a second angle of incidence. An image sensor is positioned to receive scattered light from the illumination zone, the image sensor producing signals in response to the received light. Finally, a processing device receives signals corresponding to outputs of the image sensor. The signals are processed to identify a surface placed within said illumination zone.

In another embodiment of the present invention, a method of identifying recording media in a printer is disclosed. First, a first illumination source is selected to illuminate a surface of the recording medium at a first plane of incidence. The surface is illuminated from the aid selected plane of incidence. Next, a second illumination source is selected to illuminate the surface of the recording medium at a second plane of incidence. The surface is illuminated from the selected second plane of incidence. Then, the light from the surface is sensed by an image sensor. Responsive to the light from the surface, signal is produced. Then, the signal is processed to form a characteristic vector. Finally, the characteristic vector is compared with a plurality of reference vectors characteristic of different recording media to determine media type.

DETAILED DESCRIPTION OF THE EMBODIMENTS

Figure 1A:
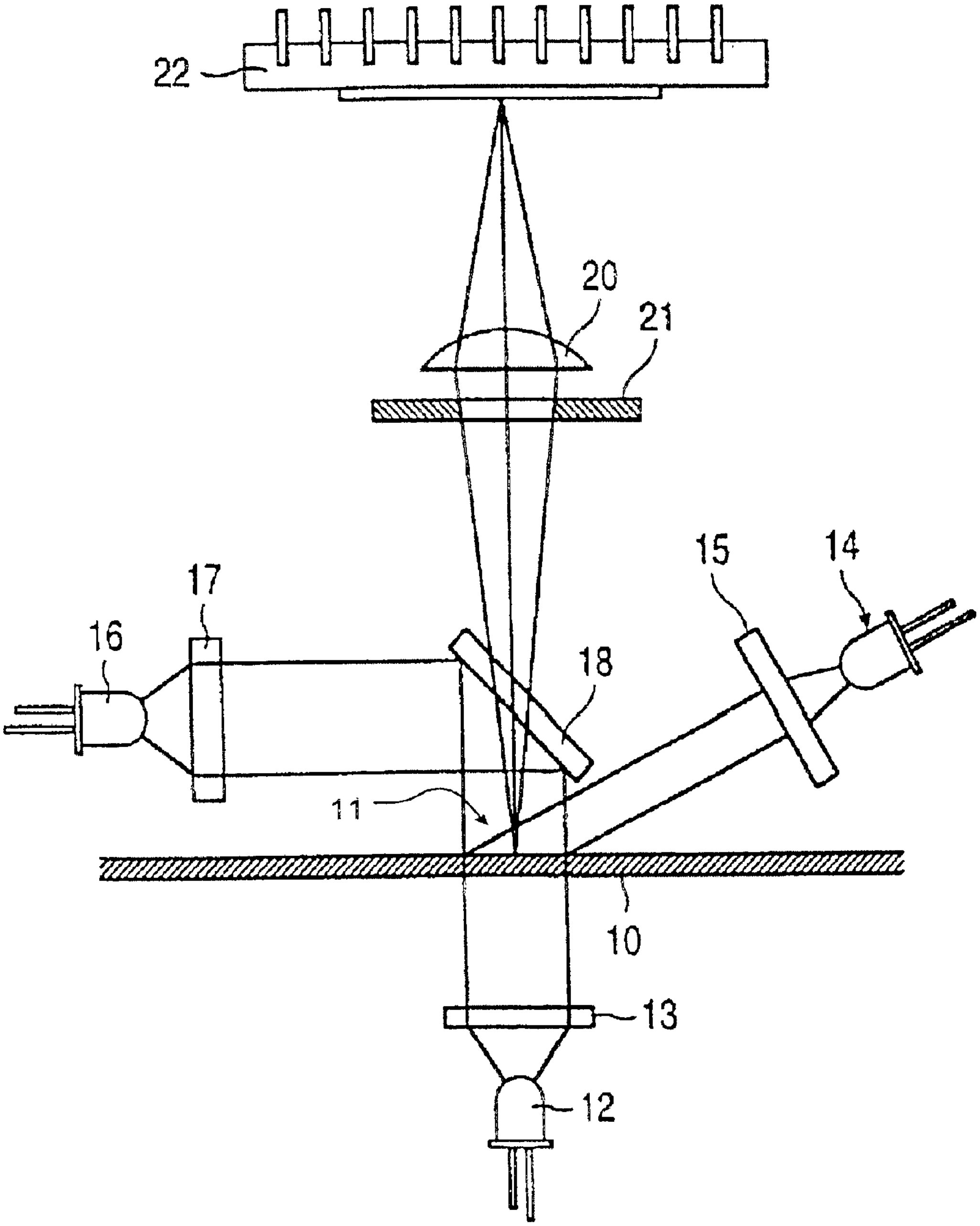
FIG. 1A is a schematic view of the illumination sources and photodetector array, according to a portion of one embodiment of the present invention.

A method and device for identifying recording media in a printer is described below. The method is based on imaging the fine structure of the recording media. Plain and special papers as well as photographic papers and other recording media have a detailed structure that when viewed under magnification and suitably illuminated is useful for discrimination between media types.

Visible features used for media identification result from choices of illumination source and imaging optics, and the optimal choice can be different for each medium. Different media can produce different features not only by using different illumination angles-of-incidence but also by using different orientations of the plane of incidence used for the illumination. Bond paper has a rich surface structure with characteristic feature sizes in the range between about 1 and 100 $\mu$m. In addition, it can have a granular directionality that shows up under different directions of illumination about the surface normal. When these features are highlighted with grazing light (light that has large angles of incidence relative to the surface normal), this light interacts with the bulk of paper fibers at or near the surface to create contrast-enhancing shadows much larger than the diameters of individual fibers. Viewed with resolution-limiting optics, only the larger shadow features are seen and produce an image unique to bond paper. Thus, a preferred choice for bond paper is grazing illumination and low-resolution optics that together highlight the lower spatial frequency features. Use of low-resolution optics has the additional benefit of permitting a relatively deep depth-of-field.

When bond paper is illuminated at higher angles off the paper surface (lower angles of incidence relative to the normal to the surface) and imaged with higher magnification, the higher spatial frequency features caused by individual fibers will have lower contrast. Moreover, since higher magnification is associated with a shallower depth-of-field, imaging with high magnification requires tighter alignment tolerances on the distance from the optics to the surface of the medium.

Photographic paper typically has closely spaced microscopic pits or depressions on the surface, but does not show much directionality. When normally incident illumination is used on photographic paper, light that is specularly reflected (or scattered) off the peaks and interiors of such pits, in directions normal or slightly perturbed from the normal, produces a feature-rich and high-contrast image with characteristic feature dimensions on the order of five microns. Thus, a preferred choice for photographic paper is normally incident illumination with higher magnification.

Coated media and the surfaces of transparencies are relatively smooth and flat but often have some small and shallow holes, although with relatively sparse distributions, that can be imaged with some detectable contrast by using grazing illumination and a low or high magnification.

According to an aspect of the present invention, a suitable compromise enables a device for identifying recording media to use a single choice of imaging or detection optics in combination with both normal and grazing incidence illumination to image distinguishing features of bond paper, coated paper, photographic paper, and transparencies.

As described further below, in addition to discriminating on the basis of feature dimensions, different media may be distinguished directly or by comparisons of such properties as optical density of features, spatial frequency of features, total reflectivity, scattering efficiency, color, wavelength dependence, contrast range, gray-scale histograms, and dependence on orientation of planes of illumination incidence.

The recording media identification device of one embodiment of the present invention includes one or more illumination sources as shown schematically in FIG. 1A wherein only one of multiple planes of illumination incidence is shown. Three sources of illumination 12, 14, and 16, are directed at recording medium 10, supported on a media path (not shown). The transmission illuminator 12 is positioned below the recording medium 10 such that light from source 12 is collimated (or otherwise directed) by illumination optics 13 and passes through the medium 10 within illumination zone 11. The illumination zone is that area of the medium 10 that scatters light from one or more illuminators such that the scattered light is detected by a sensor. Grazing illuminator 14 provides light on the medium 10 within the illumination zone 11 at a grazing angle of incidence. Light from grazing illuminator 14 is collimated (or otherwise directed) by illumination optics 15 and/or by optics included in illuminator 14. The grazing angle, which is the complement of the angle of incidence, is preferably less than about thirty degrees. To obtain higher contrast, preferably, the grazing angle is less than about sixteen degrees. Light from the illuminators 12, 14, 16 can have different wavelength distributions compared to each other.

The illumination source 16 for normal incidence illumination (i.e., perpendicular to the plane of medium 10) is also illustrated in FIG. 1A. Light from normal illuminator 16, collimated or otherwise directed by illumination optics 17, is redirected by a beam splitter 18 to illuminate the medium 10 at normal incidence placed within an illumination zone 11.

Focal lengths of the illumination optics 13, 15, and 17 are implementation dependent; however, in experiments, focal lengths of 10 mm to 16 mm have been successfully used.

The recording medium identification device further includes a photodetector array 22, also referred to as an image sensor 22, shown at the top of FIG. 1A. Light from the grazing angle illuminator 14, for example, which is scattered by the medium from within the illumination zone 11, passes through the beam splitter 18, an aperture 21, and imaging optics 20, and is detected by the photodetector array 22. The photodetector array 22 similarly senses reflected light from normal illuminator 16 and transmitted light from illuminator 12. In an alternative geometry, normal illuminator 16, illumination optics 17, and beam splitter 18 could be positioned much further above the plane of medium 10 such that beam splitter 18 is between photodetector array 22 and imaging optics 20, with appropriate modifications to the optic powers of normal illuminator 16 and illumination optics 17. In tests, an aperture stop of about 2 mm in diameter, providing front numerical aperture of about 0.1, has been used. In yet another alternative geometry, the position in FIG. 1A of the group of elements 16 and 17 could be interchanged with the group of elements 20, 21, and 22, relative to the beam-splitter 18. A beam division beam splitter, or other beam selecting device such as a rotatable wheel of multiple apertures and/or mirrors, can be used in place of beam splitter 18. Or, beam splitter 18 can alternatively be eliminated altogether by placing both the illuminator 16 and its optics 17 along a first optical axis, placing the photodetector array 22 and its imaging optics 20 and aperture 21 along a second optical axis, and tilting these two optical axes approximately an equal angle away from the normal to the medium surface and from one another, wherein both of these axes remain intersecting within the illumination zone 11.

The photodetector array 22 (also referred to as photodetection array, photosensor array, or photosensing array) is an array of optoelectronic image sensing devices, elements, or cells, such as comprising CCD or CMOS imaging devices. In a preferred embodiment, the photodetection cells (also referred to as photodetector cells, photosensor cells, or photosensing cells) are arranged in a two-dimensional array. To insure that the image field contains a sufficient number of features for medium identification, practical arrays may require as many as 100 by 100 elements, but smaller arrays of as few as 16 by 16 are preferable from design, cost, and signal processing considerations. It is not necessary for the number of elements in the two orthogonal directions of the array to be equal.

The image resolution for scanning the medium 10 surface can be determined by the most demanding medium to be identified, that is the medium and illumination combination resulting in an image with the smallest maximum feature sizes. For example, to distinguish bond paper and coated paper, the appropriate resolution corresponds to a pixel dimension on the surface of medium 10 (i.e., the projected pixel dimension) on the order of 40 $\mu$m on a side. In another embodiment, a projected pixel dimension of approximately five microns (5 $\mu$m) on a side will allow photographic paper to be better identified.

One suitable compromise for discriminating bond paper, coated paper, and photographic paper with a single set of optics is to use optics with a resolution of about 10 $\mu$m, which can be used with both grazing and normal incidence illumination. For imaging optics 20 that provide a 5-fold magnification, in this embodiment, each array element of photodetector array 22 is approximately 50 $\mu$m on a side. For a photodetector array 22 of 100 by 100 elements, using 50 $\mu$m elements and optics with a 5× magnification, an area of the surface of medium 10 that is at least 1 mm on a side should be illuminated within the illumination zone 11. Those skilled in the art will appreciate the tradeoff between feature identification and the size of the photodetector array and recognize the possibility of reducing cost by using photodetector arrays with fewer elements. Those skilled in the art will also realize additional engineering tradeoffs are possible among resolution, magnification, and size of the elements of the photodetector array.

The illumination sources 12, 14, and 16 within a plane of incidence may be one or more light emitting diodes. Alternatively, the illumination sources may be other light sources such as incandescent lamps, laser diodes or surface emitting laser diodes. For applications where medium 10 is moving rapidly, the light sources may be pulsed at higher drive levels to assure sufficient photons reach the photodetector during the exposure interval and to prevent significant motion blurring. The illumination optics 13, 15, and 17, which may be conventional, may comprise a single element or a combination of lenses, filters, and/or diffractive or holographic elements to accomplish suitably directed and/or generally uniform illumination of the target surface.

If the illumination zone 11 is fully illuminated, but not uniformly, then image sensor data from an image of a uniform reflecting surface, such as a smooth surface of opal glass, placed in the illumination zone 11, provides calibration image data for compensating any fixed non-uniformity exhibited within the illumination itself. Alternatively to using a uniform reflecting surface by which to obtain an image of this non-uniformity, a motion-blurred image can be taken of a relatively featureless medium surface, such as clay-coated paper. Motion blurring can also be used with the opal glass to reduce the potential of imaging microscopic features (patterns) within or on the opal glass.

In an alternative embodiment, the photodetector array 22 is a linear array and the recording medium is scanned past the photodetector array to produce a two-dimensional image. For example, medium 10 is scanned past photodetector array 22 by the medium transport mechanism of a printer to which the recording medium identification device of the present invention is attached. In another embodiment, photodetector array 22 is a one-dimensional array and forms a one-dimensional image, without the medium moving, that is used for medium identification. Alternatively, a single photodetector element is used, and the ink carriage, medium feeding mechanisms of the printer, or both, are used to scan the medium such that a one-dimensional or two-dimensional image is created and used for medium identification.

Figure 1B:
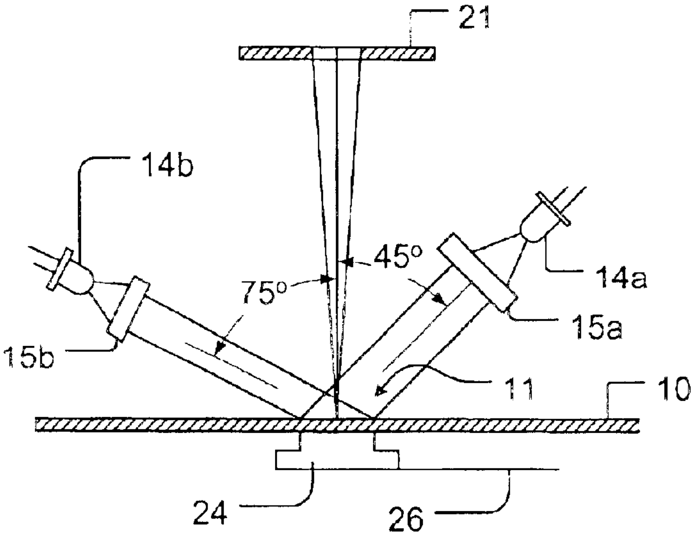
FIG. 1B is a schematic view of a portion of the illumination sources and photodetector array, according to another embodiment of the present invention.
Figure 1C:
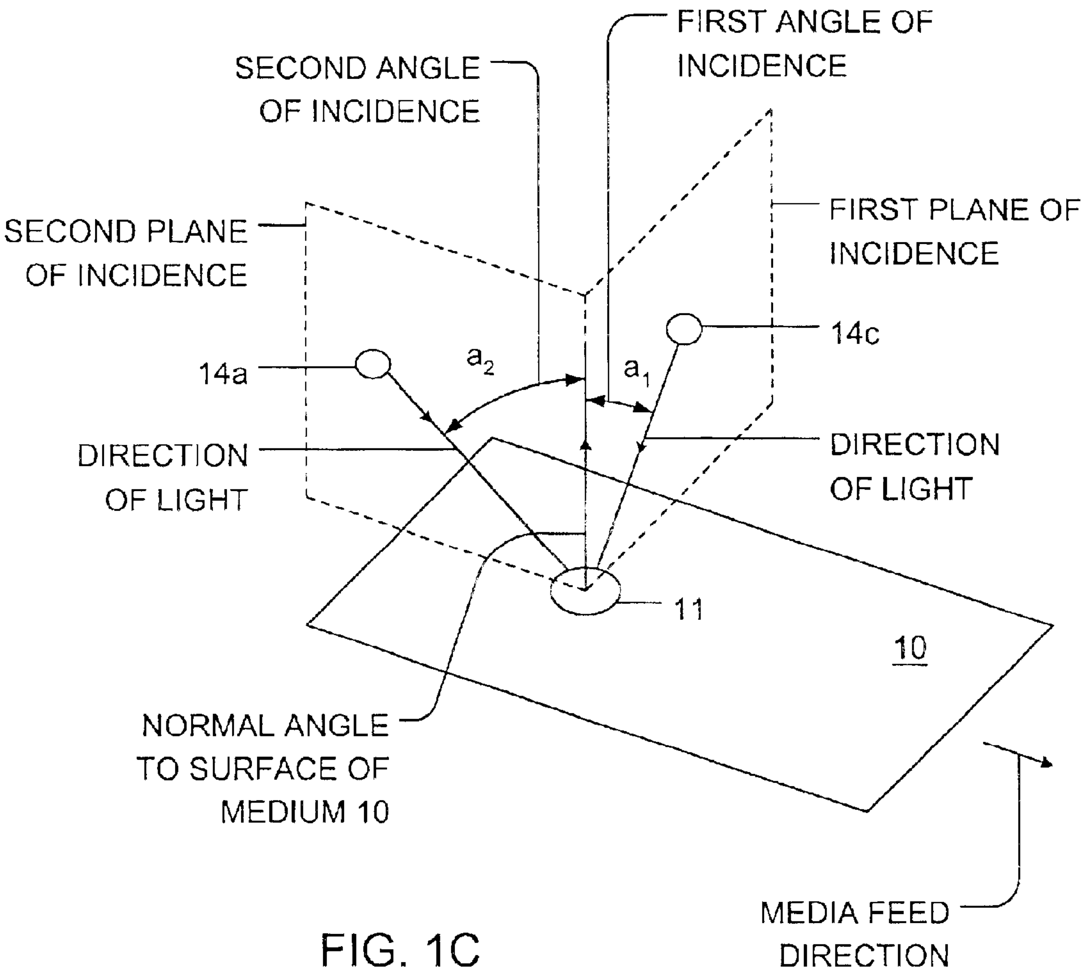
FIG. 1C is a diagram illustrating the angles and planes of incidence in one embodiment of the present invention.

An embodiment of the invention having a certain alternative configuration is partly shown in FIG. 1B and FIG. 1C.

Portions of this embodiment are similar to those shown in FIG. 1A. For convenience, components in FIG. 1B and FIG. 1C that are similar to components in FIG. 1A are assigned the same reference numerals, analogous but changed components are assigned the same reference numerals accompanied by letters "a," "b," and "c," and different components are assigned different reference numerals. In FIG. 1B, illuminators 14*a* (first illumination source) and 14*b* (second illumination source) have incidence angles, a1 and a2, nominally at 45 and 75 degrees, respectively. Incidence angles are given relative to the normal angle to the recording medium 10. Depending upon the surface profile of microstructure comprising the surface of the media 10, different angles produce different degrees of contrast within the surface images collected and processed by the sensor 22 of FIG. 1A. For clarity of illustration, only two illuminators 14*a* and 14*b* are shown in FIG. 1B illuminating the illumination zone 11; however, three, four, or more illuminators can be used to illuminate the medium 10 in ways to obtain a greater differentiation between measured characteristics. In FIG. 1B, the illuminators 14*a* and 14*b* are shown as lying in a common plane-of-incidence, although oppositely directed. In FIG. 1C, the illuminators 14*a* and 14*c* are shown as lying in different planes of incidence. Such implementation can be used to help discriminate media on a contributing basis of grain-directionality or other feature directionality.

Using multiple illuminators in such fashion can permit use of illuminations with different colors, different angles of incidence, and different orientations of planes-of-incidence. The different colors could include, for example, blue, green, red, and infrared. LED (Light Emitting Diodes) can be used for this purpose. The first plane of incidence and the second plane of incidence can be orthogonal to each other. In addition, one of the angles of incidence can be at an angle ranging between 0 and 85 degrees relative to normal to the illuminated medium surface.

Since different media scatter and reflect light in different ways, it is advantageous to illuminate the media in as many different ways as practical. Different media will scatter light differently with different incidence angle and orientations of the planes of incidence about the surface normal. It is the uniformity or lack thereof in this scattering behavior with position on the surface that enables an imaging array 22 to help differentiate media. But the mean behavior across the photodetecting elements of such an imaging array 22 also remains an important differentiator. Combining information about both the mean behavior and the variation of behavior across an imaging array 22 greatly improves the discrimination ability of the current invention over the prior art. The use of multiple illumination colors of course greatly helps differentiate colored media or media that otherwise interacts differently with light of different wavelengths. Use of illumination with short wavelengths in the blue to ultraviolet (some even non-visible wavelengths) can easily aid in the differentiation of media having a whitening agent from those that do not have a whitening agent.

In FIG. 1B, a media supporting surface 24 is shown on the opposite side of the media 10 from the illuminators 14*a* and 14*b*. Also shown is a supporting surface positioner 26 connected to the supporting surface 24. It is important that the reflecting and scattering properties of this supporting surface be well controlled. Preferably, the supporting surface 24 is a light-absorbing black and may have a hole for passing illumination from below. The surface 24 may be removed using the supporting surface positioner 26 when illuminating the media 10 from below, as when using illuminator 12 in FIG. 1A. Media such as paper and transparencies are not totally opaque and will therefore scatter a different amount of light to the array 22 from the illuminators 14*a* and 14*b* depending upon the properties of this support surface 24, so it is important that it not be an uncontrolled variable.

The illuminators 14*a*, 14*b*, and 14*c* are typically turned on one at a time. A microprocessor controls the illuminators 14*a*, 14*b*, and 14*c*, etc. including selecting which illuminator to turn on at any given time. To realize the media differentiation, the microprocessor selects the first illuminator 14*a* to illuminate the surface of the recording medium 10 at a first plane of incidence, thus illuminating the surface from said selected plane of incidence. Then, scattered light from the surface is sensed by at least one sensor element. Next, a signal is produced from the sensed light and the signal is processed alone, or in combination with signals corresponding to other illuminations, to form a characteristic vector. Finally, the formed characteristic vector is compared with a plurality of reference vectors characteristic of different recording media to determine media type by choosing the closest match. One skilled in the art can appreciate that a variety of alternatives is available by which to define what is a closest match. These steps and one such match-choosing criterion are discussed in more detail herein.

Figure 2:
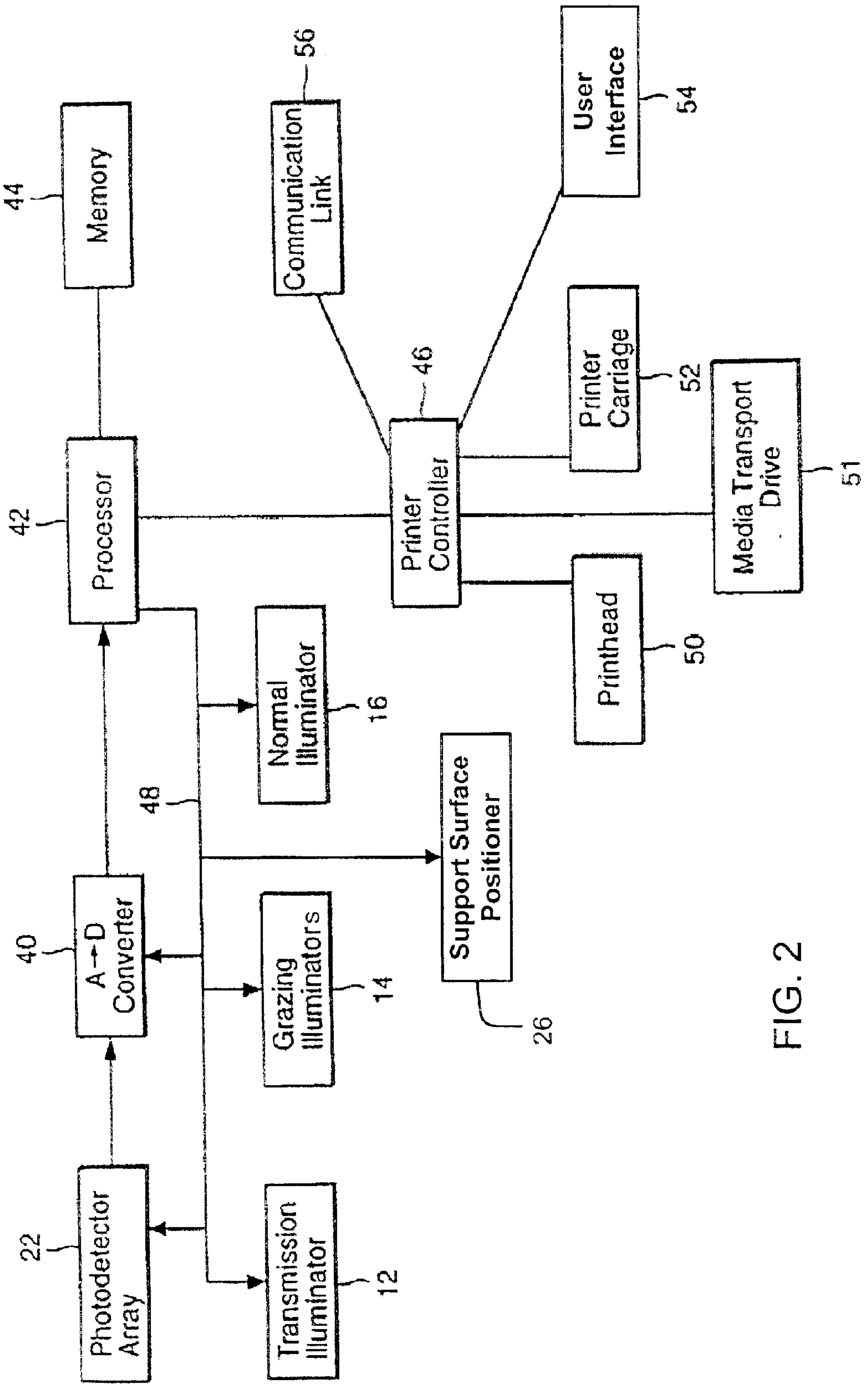
FIG. 2 is a block diagram of the components of the recording media identification device, according to an embodiment of the present invention.

FIG. 2 is a block diagram of the components of one embodiment of the recording media identification device. The photodetector array 22 is connected to an analog to digital converter 40, which provides input to a processor 42 with associated memory 44. Converter 40 may use quantization levels for a 256 level gray scale or lower, such as a 16 level gray scale. Processor 42 controls the measurement process, including the selection sequence of illumination and image capture, and processes the digitized photodetector values. For example, the processor 42 is used as the means for selecting, at any instant in time, one of the available illuminators for providing light within the illumination zone by turning on the selected illuminator. In the embodiment shown in FIG. 2, processor 42 is connected to a printer controller 46. Processor 42 may be a serial processor, or it may be an ASIC designed for rapid extraction of characteristics. Processor 42 may involve, for example, software or hardware implemented Fourier Transform. Alternatively, processor 42 may actually be the printer controller 46. For example, the processor 42 can calculate the characteristic vector as an average of local differences between pixels within an image. Further, the average can be normalized by a local mean. Later, the characteristic vector is compared to a reference vector as discussed herein below. In another implementation, the characteristic vector is proportional to a summation of local differences between pixels within an image.

Image processing in the printer for media identification may be as simple as compressing the data and transmitting it to a host computer, via communication link 56 attached to the printer controller 46, or as complex as all the operations necessary to derive a characteristic vector. In the simple case, pixel values are communicated to the host (with optional data compression) where the characteristic vector is computed and the media identification made. This is attractive because it simplifies the image processing in the printer with a potential saving in cost and increase in flexibility. Using the resources of the host computer, the characteristic vector and media identification may be done very rapidly, and the process and selection criteria can be updated when new drivers are made available. The minor disadvantage is a short delay as pixel data are sent back to the host.

When the characteristic vector is computed in the printer, fewer bytes are transmitted than when the identification process is performed in the host computer. This would be more appropriate when two-way communication with a host is not convenient, as when print jobs are sent to a print queue on a printer server on a network, or as when a print job is downloaded by infra-red link from a portable information appliance.

In FIG. 2, the printer controller 46 is shown controlling the printhead 50, media transport drive 51, printer carriage 52, and user interface 54 including an output device such as a display and an input device such as selection buttons, alpha or numeric keypads, or a combination of these devices. It will be appreciated that other elements of a printer could also be controlled by the printer controller 46 in response to identification of specific recording media. The processor 42 is also connected to the illumination sources 12, 14, and 16, the photodetector array 22, converter 40, and support surface positioner 26 via link 48. Link 48 is used to send signals from the processor 42 to control, for example, the timing of illumination by each illuminator, positioning of the support surface, and data acquisition by the array 22 and converter 40.

To identify a recording medium, output from the photodetector array 22 is converted to digital form and processed into a vector of characteristic values (described later). This vector is compared to previously stored reference vectors, each reference vector being characteristic of a different type of recording medium, to determine the medium type. The apparatus can also process a new medium type, generating a newly acquired characteristic vector, from one or more samplings of this new medium, and store this newly acquired characteristic vector as a new reference vector representing the new medium. This would comprise a method permitting the apparatus to train itself to recognize new media types. For example, when the processor 42 determines that a characteristic vector does not fit into any of the existing reference vectors, then the processor 42 may communicate with the printer controller 46, and, ultimately with the user interface 54 to query the operator of the printer whether to store (in the memory 44) the acquired characteristic vector as a new reference vector. During the query process, the user interface 54 can be used to enter an identification or a name for the new reference vector. The user interface can also be used by a user to directly command the processor to sample a new media and store its characteristic vector as a new reference vector.

As described above, the medium identification device of the present invention includes one or more illumination sources. In some embodiments, information from multiple illumination sources is obtained by time sequencing the measurements, first turning on one illumination source and obtaining a signal, and then turning on a second illumination source and obtaining a second signal, etc. Alternatively, information from multiple photodetector arrays (with respective converters, illumination sources, and optics) is obtained and processed together. The spectral output of the various sources may be different to provide optimized differentiation of characterization vectors and/or to allow dichroic filters to be used to combine some of the optics when using multiple photodetector arrays.

Characteristics of the recording medium forming the basis of classification of media may include integrated reflectivity (or scattering efficiency) (or average gray scale value) over the field, distribution parameters of gray scale values, spatial frequency parameters of features in the image, number of features in the image within a specified band of feature parameters, or any combination of these or other characteristics.

Features are defined, for example, as regions of contiguous pixels, all above (or alternatively below) a threshold gray scale value. These and other characteristics are derived from processing the digitized output of the photodetector array 22. Spatial frequencies may be determined, for example, by a standard use of one- or two-dimensional Fourier transforms. Alternative or additional characteristic values, or parameters, can include such parameters as pixel-value mean, median, root-mean-absolute-difference-from-the-mean, and standard deviation. Statistical parameters can be normalized by parameters such as mean or median.

Each characteristic value constitutes one element of the characteristic vector. For embodiments in which multiple types, locations, or orientations of illumination sources are used, each utilized combination of illumination type, location, or orientation produces a characteristic value or element. Each type of illumination could be implemented with a unique spectral property or color, as by choice of illuminant or by incorporation of a color filter in the illumination or imaging optics. Some elements of the characteristic vector may be valued on a continuous scale, while others may be on a scale of discrete values.

The characteristic vector, denoted by V, is compared with reference vectors $R_i$ that have been stored in the memory 44 (or within the host computer) to identify the recording medium. Each reference vector $R_i$ is characteristic of a different type of recording medium. If P characteristic values provide reliable media identification, then the reference vectors $R_i$ and the characteristic vector V have the dimension P. In typical applications, P will range between 3 and 10. Each recording medium corresponds to a region in a P-dimensional space representing the range of expected values corresponding to that medium. The size of the range reflects batch to batch variation in manufacture of the media, differences between manufacturers of similar media, and variation of measurement. If the characteristic vector V lies within the region corresponding to a particular medium type, it is identified as that medium.

Figure 3:
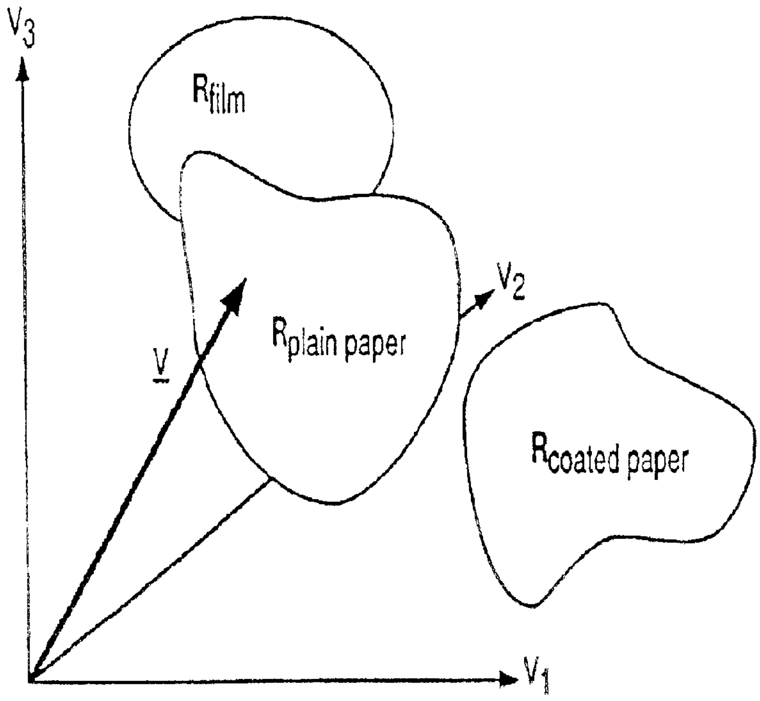
FIG. 3 is a schematic representation of the characteristic values used to identify recording media.

The comparison of characteristic vector V with reference vectors $R_i$ is shown schematically in FIG. 3 for the case where the dimension P is three. The comparison may take the form of a simple algebraic test of whether the vector V lies within a P-dimensional sphere of radius $S_i$ or other region around a reference vector $R_i$. Expressed mathematically using spherical regions, vector V is identified as belonging to recording medium i if the inequality:

$$\left[\sum_{j=1}^{P}(V_j-(R_i)_j)^2\right]^{1/2}\leq S_i$$

is satisfied, where $S_i$ is a maximum threshold distance of vector V from reference vector $R_i$. Alternatively, standard techniques known in the art for finding membership functions using fuzzy logic, such as use of multidimensional polynomials or look-up tables, may be used for the comparison. Weighting factors may be applied to the j-terms on the left-hand-side of the above expression, and the best match with a reference vector can be selected as that which produces the smallest resultant sum.

Although FIG. 3 illustrates only three (3) dimensions of analysis, additional dimensions can be utilized to allow even finer distinction among print media.

Figure 4:
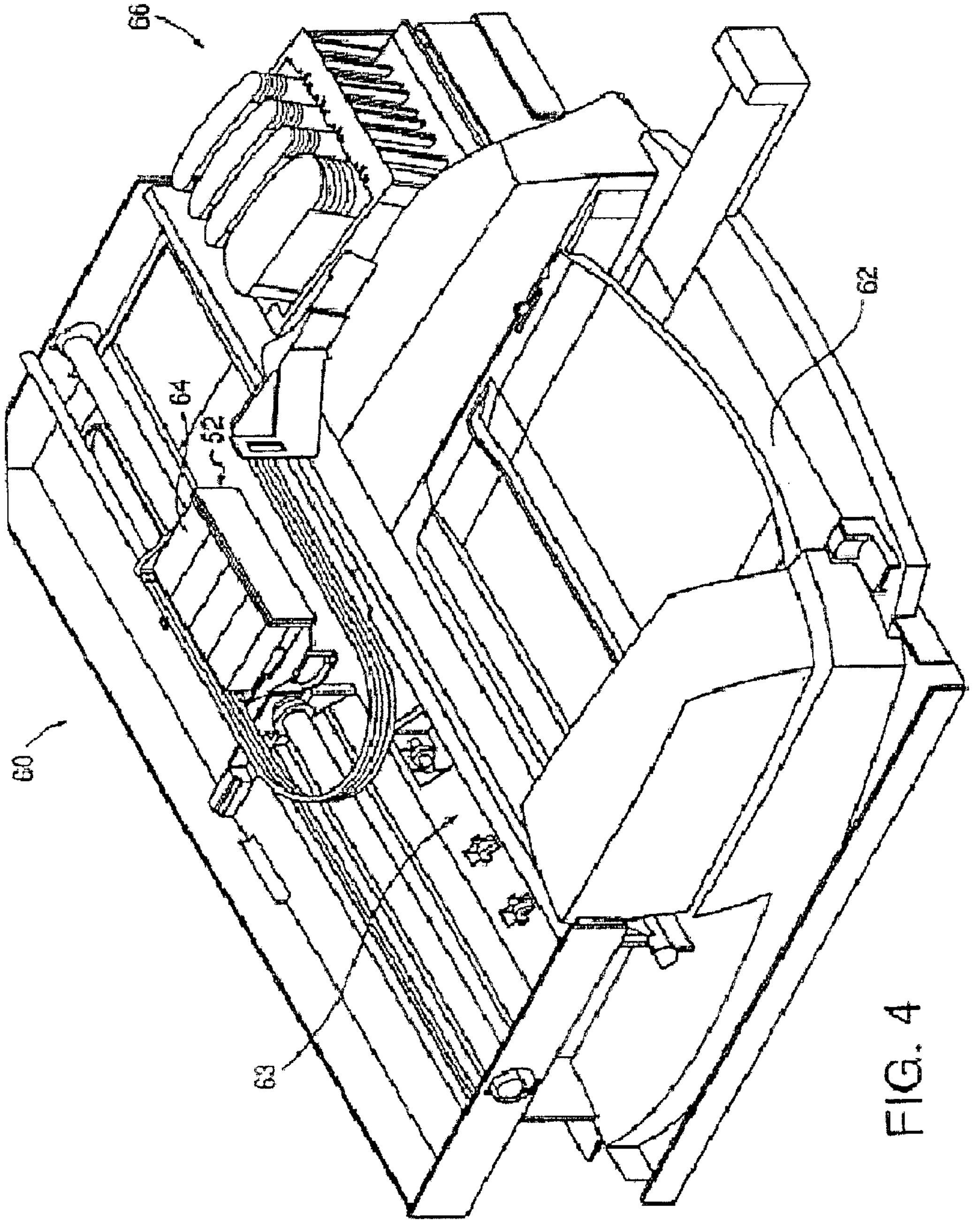
FIG. 4 is one example of a printer including the recording media identification device of the present invention.

The printer elements indicated schematically within FIG. 2 are elements, for example, of a desktop ink jet printer 60 as shown in FIG. 4. The device of FIG. 1 is internal to the printer 60 along the media path. Generally, printer 60 has a media tray in which sheets 62 of media are stacked. A roller assembly forwards each sheet 62 into a print zone 63 for printing. Print cartridges 64 mounted in a carriage 52 are scanned across the print zone, and the medium is incrementally shifted through the print zone. Ink supplies 66 for the print cartridges 64 may be external to or internal to the print cartridges 64.

This and other printers typically operate in multiple, user-specified quality modes, termed, for example, “draft”, “normal”, and “best” modes. To optimize performance of an ink jet printer, properties such as ink type, ink drop volume, number of drops per pixel, printhead scan speed, number of printhead passes over the same area of the medium, and whether pigmented black or composite dye-based black (i.e., combination of cyan, magenta, and yellow dyes) is used, are customized to each recording medium and for each print quality mode. In a laser printer, typically, the media feed rate, exposure levels, toner charging, toner transfer voltage, and fuser temperature might be adjusted to optimize performance on different media.

The main categories of recording media are plain paper, coated matte paper, coated glossy paper, transparency film, and “photographic quality” paper. Large format ink jet printers support additional media or material such as cloth, Mylar, vellum, and coated vellum. In printers designed to use these and other additional media, appropriate additional categories can be defined to identify these additional media or materials.

A new characteristic vector $R_i$ can be developed for new or unknown media type by training the printer with several measurements and samples with user intervention to specify the preferred print mode. This allows old media to be retired and new formulations introduced. In addition, the print mode can be automatically set to optimize print quality to the formulation of a local special paper, such as an organization’s stationery, which may have a special rag and wood pulp content, filler, sizing, or even applied physical texture.

Although the invention has been described with reference to particular embodiments, the description is only an example of the invention’s application and should not be taken as a limitation. For example, implementations of various aspects of the invention have demonstrated the utility of a stand-alone, portable, media identification tool, not tied to a printer but given a display and push-button controls with which to effectively “read” media types the tool is placed against. Various adaptations and combinations of features of the embodiments disclosed are within the scope of the invention as defined by the following claims.

We claim:

1. An apparatus comprising:

a first illumination source for providing light on a media illumination zone at a first angle of incidence;

a second illumination source for providing light on said media illumination zone at a second angle of incidence, wherein the light from the first source is a different color than the light from the second source;

an image sensor positioned to sense light scattered at said illumination zone, said light from at least one of said illumination sources, the image sensor capable of imaging recording medium surface features; and a processor for processing outputs of said image sensor to identify a recording medium type based on the imaged surface features.

2. The apparatus of claim 1 wherein angle of incidence of said light fro m said first illumination source and angle of incidence of said light from said second illumination source define a first and second plane of incidence, respectively.

3. The apparatus of claim 2 wherein said image sensor receives scattered light from said first and second planes of incidence corresponding to said first and said second illumination sources.

4. The apparatus of claim 3 wherein said first and second planes of incidence are orthogonal to one another.

5. The apparatus of claim 4 wherein one of the planes of incidence is parallel to a media path of a printer and the other of the planes of incidence is parallel to the travel direction of travel of an ink carriage.

6. The apparatus of claim 4 wherein one of the planes of incidence includes an angle of incident illumination ranging between 0 and 85 degrees relative to normal to the illuminated medium surface.

7. The apparatus of claim 1 wherein the first angle of incidence is about 45 degrees, and the second angle of incidence is about 75 degrees.

8. The apparatus of claim 1 wherein said light from one of said first and second illumination sources is in a range of wavelengths of blue to ultraviolet light.

9. The apparatus of claim 1 wherein the processor is programmed to run a measurement and analysis sequence, and display a medium identification result.

10. The apparatus of claim 1, wherein the first and second angles of incidence are different, whereby the light of different colors are directed onto the illumination zone at different angles of incidence.

11. The apparatus of claim 1, wherein the surface is the surface of a print medium, and wherein the sensor can image the fine structure of the print medium.

12. The apparatus of claim 1, wherein the processor uses the output signals to compute statistics about the different colors of light sensed at the illumination zone, and uses the statistics to determine the type of surface.

13. The apparatus of claim 12, wherein using the statistics includes forming a characteristic vector from the statistics for the different colors of light, and using the characteristic vector to identify a type of medium.

14. The apparatus of claim 13, wherein the processor maintains a database of reference vectors corresponding to different types of media; and wherein the processor uses the characteristic vectors by comparing the characteristic vectors to the reference vectors.

15. A method of identifying a type of recording medium, the method comprising:

illuminating a portion of a surface of the medium with light of a first color at a first angle of incidence and light of a second color at a second angle of incidence;

creating images of the illuminated portion;

forming a characteristic vector from the images, and using the characteristic vector to identify the medium type.

16. The method of claim 15 wherein the characteristic vector is proportional to a summation of local differences between image pixels.

17. The method of claim 16 wherein the summation of local differences is normalized by a local mean and is compared to similar results from a reference vector.

18. The method of claim 15, wherein the characteristic vector identifies 3–10 recording medium characteristics.

19. The method of claim 15, wherein the characteristic vector is compared to one or more reference vectors corresponding to different types of print media.

20. The method of claim 19 wherein a characteristic vector having P characteristics matches a reference vector if the characteristic vector is within a P-dimensional region of the reference vector.

21. The method of claim 19, further comprising learning about new recording media by adding a new characteristic vector to the reference vectors.

22. A printer comprising:

a media path;

a device including at least one illumination source for illuminating a target area along the media path, the target area illuminated with light of different colors; and an image sensor for generating a plurality of images of the target area, at least some of the images of the target area under different colors of light; and a processor for processing the images to perform print media identification.

23. The printer of claim 22, wherein at least two different colors at different angles of incidence are separately used to illuminate the target area.

24. The printer of claim 22, wherein the processor uses the images to compute statistics about the different colors of light sensed at the target area, and uses the statistics to identify a type of recording medium.

25. The printer of claim 24 wherein a characteristic vector is formed from the statistics for the different colors of light, the characteristic vector being used to identify the recording medium type.

26. The printer of claim 25, wherein the processor maintains a database of reference vectors corresponding to different types of print media; and wherein the processor compares the characteristic vector to the reference vectors, a result of the comparison identifying the recording medium type.

* * * * *